United States Patent [19]
Hempell

[11] 3,780,360
[45] Dec. 18, 1973

[54] SHAFT POSITIONING MEANS
[75] Inventor: Leo Bruce Hempell, Almonte, Ontario, Canada
[73] Assignee: David Green Associates Limited, Ottawa, Ontario, Canada
[22] Filed: Dec. 15, 1971
[21] Appl. No.: 208,299

[52] U.S. Cl............. 318/138, 318/16, 318/467, 318/673, 318/557, 318/685, 317/148.5 B, 307/252 J
[51] Int. Cl. ......................................... H02k 29/02
[58] Field of Search............ 318/673, 16, 675, 318/557, 467, 138; 317/148.5 B; 307/252 J

[56] References Cited
UNITED STATES PATENTS

| | | | |
|---|---|---|---|
| 3,249,877 | 5/1966 | Eggman | 318/467 X |
| 2,989,679 | 6/1961 | Guzskie | 318/467 X |
| 2,965,829 | 12/1960 | Linkenbrink | 318/467 |
| 3,350,606 | 10/1967 | Hirsch | 317/148.5 B X |
| 3,622,854 | 11/1971 | Imai | 318/67 S |
| 3,273,037 | 9/1966 | Winestock et al. | 318/467 |
| 3,241,003 | 3/1966 | Snell et al. | 317/148.5 B |

OTHER PUBLICATIONS
RCA Technical Notes, No. 503, March 1962.

*Primary Examiner*—G. R. Simmons
*Attorney*—Christopher Robinson et al.

[57] ABSTRACT

Means for sequentially positioning a shaft in different angular positions which enables slower operation than a stepping switch, eliminates the need for cam-operated holding contacts and operates on a DC source. An SCR and momentary interrupter are connected in series with a DC motor and battery. A gate signal to the SCR starts the motor rotating which drives the momentary interrupter until the shaft reaches a predetermined angular position at which time the momentary interrupter momentarily opens and closes the circuit so the SCR stops conducting and the motor stops until another pulse is applied to the gate of the SCR. The momentary interrupter comprises a conductive cam on which a contact slides. Drop-off portions on the cam momentarily interrupt the circuit.

9 Claims, 3 Drawing Figures

SHAFT POSITIONING MEANS

BACKGROUND OF THE INVENTION

1. Field of the Invention

This invention relates to means for sequentially moving a shaft driven by a DC motor to each of a plurality of predetermined angular positions.

2. Description of the Prior Art

Stepping motors are known which can move a shaft sequentially through angular increments in response to successive input signals. These, however, act very quickly whereas the means according to the present invention act comparatively slowly and enable certain functions to be carried out depending on the shaft position in between consecutive stationary positions of the shaft, as will become clearer as the description proceeds.

The invention uses an SCR in series with a DC motor and a momentary interrupter which momentarily opens and then closes the circuit to the SCR so that the SCR becomes non-conductive and the motor stops. A signal applied to the gate of the SCR makes it conductive again so that the motor again begins turning. It is known to use SCR's in series with AC motors and there is no particular problem in stopping the motor in the absence of a gate signal on the SCR because the SCR stops conducting as soon as the AC source goes negative.

It is also known to control the angular position of a DC motor by having an input signal close relay contacts to energize the motor. When the motor begins to turn, a cam follower lifts out of a depression in a cam and closes holding contacts for the motor so that the motor continues rotating even when the relay signal ceases. When the cam follower drops down in a subsequent depression in the cam, the holding contacts open and the motor stops rotating.

SUMMARY OF THE INVENTION

The present invention eliminates the need for relay contacts and cam operated holding contacts in an arrangement using a DC source, e.g. a battery.

According to the invention, there is provided means for sequentially moving a shaft driven by a DC motor to each of a plurality of predetermined angular positions comprising an SCR and momentary interrupter connected in series circuit with the motor between a pair of terminals adapted to be connected to a DC source. The SCR has a gate electrode to which an input signal is applied to cause the SCR to conduct current so that the motor rotates. The motor is mechanically coupled to the momentary interrupter so that when the shaft reaches one of the predetermined angular positions, the momentary interrupter momentarily opens and again closes the series circuit whereby the SCR stops conducting while the circuit is open and the motor stops until an input signal is again received at the gate electrode of the SCR.

Preferably the motor is mechanically coupled to the momentary interrupter via reduction gearing to extend the time between actuation of the SCR and stopping of the motor at a subsequent predetermined angular position.

The momentary interrupter may comprise a conductive cam mounted for rotation by the motor on said shaft, the shaft also being of conductive material. A first sliding contact rides on the shaft and a second sliding contact rides on the cam. The cam has a plurality of segments equal in number to said plurality of angular positions and each segment ends in an abrupt drop-off so that as the motor turns the cam, said second sliding contact falls from a drop-off at the end of one segment onto the beginning of the next segment and current to the SCR is interrupted during this fall of the second sliding contact. Even though the interruption is very brief, e.g. a microsecond, it is sufficient to allow the SCR to stop conducting. As the circuit is immediately closed again, it is ready to operate as soon as the gate of the SCR receives another pulse.

Preferably a resistor is connected in parallel with the motor to avoid a possibility of current through the SCR being interrupted during commutation of the motor.

One application of the invention is in a toy tracked vehicle adapted for remote control by, for example, sound waves which may be ultrasonic sound waves if desired. The toy vehicle may be provided with an audio amplifier fed by a frequency-selective microphone and the output of the amplifier is connected to the gate of the SCR so as to trigger it into conduction when the microphone receive acoustical signals in a frequency range to which it is sensitive. Each time the SCR is triggered on, the DC motor moves through a predetermined angular range and its shaft is connected, preferably through reduction gearing, so as to actuate switches which control left and right track motors in the toy vehicle cyclically between first and second positions to control current flow to the track motors so that each moves either forward or reverse cyclically such that the toy vehicle moves forward, reverse, left turn, right turn, cyclically in response to successive occurrences of an input signal derived from the amplifier.

DESCRIPTION OF THE PREFERRED EMBODIMENTS

Figure 1:
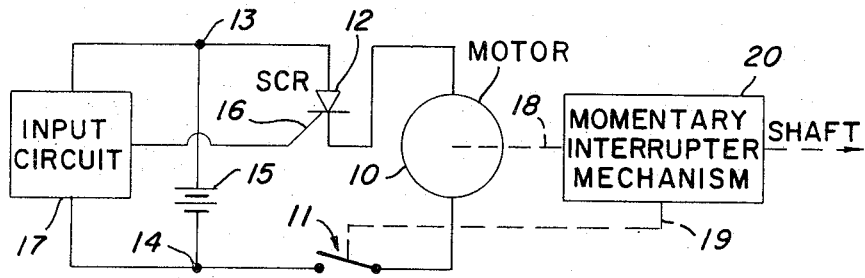
FIG. 1 is a partly block diagram illustrating the invention in its broader aspects.

Referring to FIG. 1, there is shown a motor 10 in series with a momentary interrupter 11 and an SCR 12 between a pair of terminals 13 and 14 adapted to be connected to a DC source 15. The SCR 12 has a gate electrode 16 to which an input signal may be applied from input circuit 17 to cause the SCR 12 to conduct current so that motor 10 rotates. The motor is mechanically coupled to the momentary interrupter 11 so that when the shaft reaches one of its predetermined angular positions, the momentary interrupter momentarily opens and again closes the series circuit so that the SCR stops conducting while the circuit is open and the motor stops until an input signal is again received at the gate electrode of the SCR. The motor is shown mechanically coupled by dashed lines 18 and 19 through a momentary interrupter mechanism 20 to the momentary interrupter 11 although items 11 and 20 might be considered together as constituting the "momentary interrupter."

Figure 2:
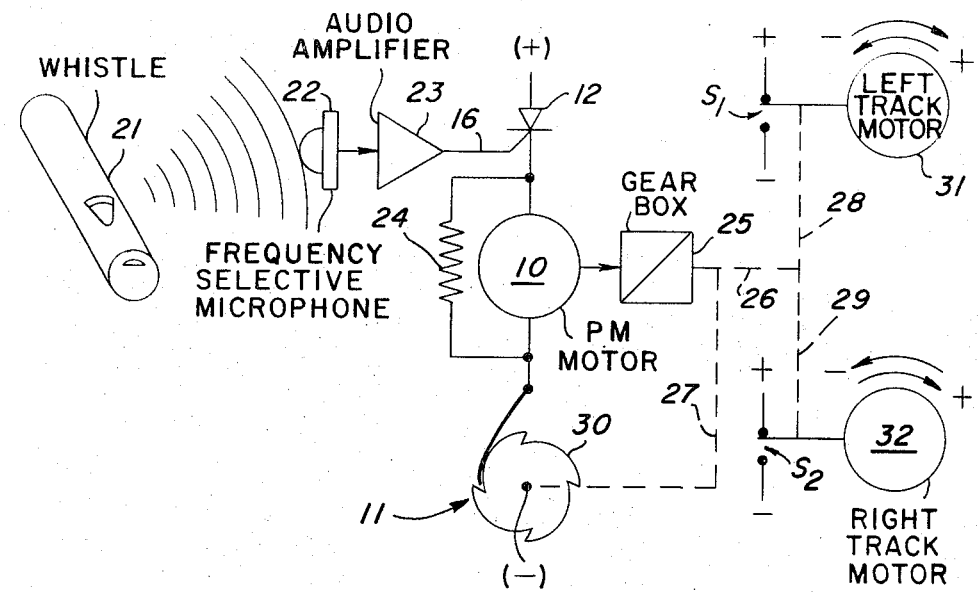
FIG. 2 shows, again partly in block diagram form, a more detailed version of an arrangement using the invention.

Reference to FIG. 2 should make the invention and a practical application of it quite clear. Here there is shown a sound source 21, e.g. a whistle, which can be used to control the shaft positioning means in the toy vehicle. When the whistle 21 is blown, this is detected by a frequency-selective microphone 22 feeding an amplifier 23 which, in turn, feeds the gate 16 of SCR 12. SCR 12 thus begins conducting and DC motor 10, shown here as a PM (permanent magnet) motor, begins turning. Current flows from the plus terminal indicated through SCR 12, PM motor 10 (and parallel resistor 24), momentary interrupter 11 to the negative terminal indicated.

The shaft of the PM motor 10 is coupled through a gear box 25 and the output of the gear box 25 is represented by dashed lines 26, 27, 28 and 29. In actual fact, the output of gear box 25 is simply a single shaft which moves through a plurality of predetermined angular positions, in this case, four. The output of the gear box 25 turns the cam 30 of momentary interrupter 11 in a counter-clockwise position as seen in FIG. 2. At the same time, the output shaft of gear box 25 controls the positions of switches $S_1$ and $S_2$ so as to connect the left track motor 31 and the right track motor 32 sequentially in forward and reverse so that the toy vehicle moves forward, reverse, left, right, forward again, etc. Thus by simply blowing the whistle 21, the toy vehicle may be controlled to move forward or backward or to turn left or right.

In actuality, cam 30 may be directly mounted on the output shaft of gear box 25 and also mounted on this shaft may be a cam which drives the movable contacts of switches $S_1$ and $S_2$ between their forward and reverse connections indicated by (+) and (−) signs on the drawing.

Figure 3:
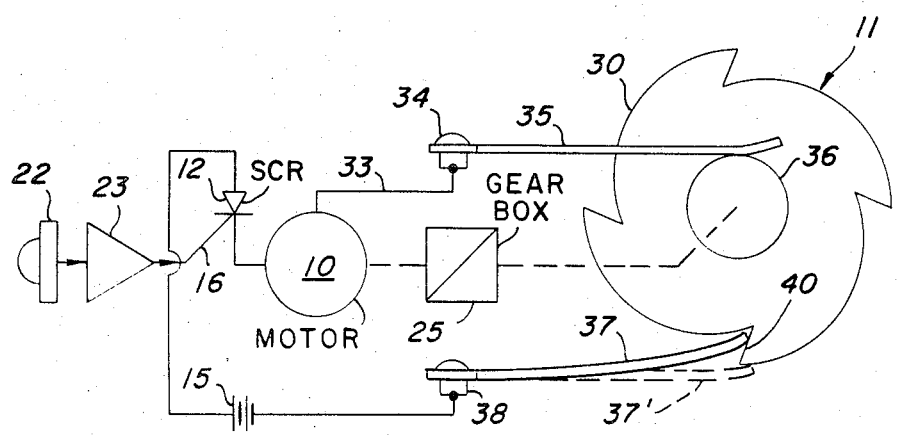
FIG. 3 shows on an enlarged scale the momentary interrupter.

The action of the momentary interrupter may be understood more easily from FIG. 3 which shows it on an enlarged scale. As explained before, a signal picked up by microphone 22 is amplified by amplifier 23 and fed to the gate 16 of SCR 12 which begins conducting current from DC source 15 through motor 10 and momentary interrupter 11. Specifically, from motor 10 current flows over line 33 to a fixed terminal 34 to which is secured a sliding contact 35, contact 35 sliding on the conductive shaft 36 to which conductive cam 30 is secured. It will be appreciated that shaft 36 is the output shaft of gear box 25.

Current flows from sliding contact 35 through shaft 36, cam 30 to sliding flexible contact 37 to fixed terminal 38 and then back to the battery 15. As viewed in FIG. 3, the cam rotates counter-clockwise and at 37, there is shown in dashed outline the sliding contact 37 as it reaches the end of one segment of the cam 30. In solid line is shown sliding contact 37 just after it leaves the end of the preceding segment of the cam 30. During the time that sliding contact 37 drops from the end of one segment of cam 30 to the beginning of the following segment, current flow to the SCR 12 is interrupted so that it ceases conducting. Another signal must be received by microphone 22 in order to make SCR 12 conduct again and turn cam 30 through another one-quarter turn.

It will be noted that the cam 30 is undercut at the end of each segment as indicated at 40. This is to ensure that sliding contact 37 actually drops to the next segment of the cam and does not merely slide down. In other words, it definitely ensures that the circuit is interrupted.

While the invention has been shown in connection with a remote control system using sound waves, it will be obvious that exactly the same system could also be used with other remote control means, e.g. radio control, by replacing the frequency-selective microphone 22 with a suitable receiver means. Photoelectric means could also be used.

It will be appreciated that a long blast on the whistle 21 could result in cam 30 moving over more than one segment before coming to rest. This would happen if the whistle was still being blown when movable contact 37 dropped down onto a new segment because SCR 12 would again be triggered on. The gear box 25 slows down the cam 30 sufficiently so that a single short "toot" of the whistle 21 will not cause the sliding contact 37 to move over more than one segment of cam 30. A longer blast on the whistle 21 will cause contact 37 to move over more than one segment of cam 30 but in the present application, a toy vehicle, the consequences need not be worried about. In fact, an operator might enjoy seeing what happens following a long blast of the whistle.

While the invention has been described primarily for use in a toy vehicle, it will be appreciated that it could find many other applications. For example, the output shaft of the gear box could be connected to rotate a turret-type television tuner switch.

The output shaft of gear 25 may be connected through a second gear box having an output shaft driving an additional switch (or switches) and a further interrupter which would be connected in series with the first interrupter. Assuming a 10 to 1 reduction gearing for each gear box, the first interrupter would stop the motor after every tenth turn of the motor whereas the second interrupter would stop the motor after every 100 turns of the motor. One application of this arrangement, although not necessarily with the gearing reduction mentioned, would be in a toy hoist. The output shaft of one gear box might control switches for a motor raising and lowering the hoist whereas the output shaft of the second gear box might control opening and closing of a bucket on the hoist.

It may be that other cam shapes would be suitable besides that shown in the drawings. It is to be noted that the arrangement shown does not depend on inertia of the motor and other rotating parts to carry the cam beyond any "dead" position. The sliding contact 37 simply drops straight off one segment onto the following segment.

Obviously the cam 30 could have more or less than four segments, as desired. A further segment could be provided, for example, so that the toy would come to a complete stop at the end of each cycle, this being accomplished by having a neutral position for switches $S_1$ and $S_2$.

What we claim as our invention is:

1. Means for sequentially moving a shaft driven by a DC motor to each of a plurality of predetermined angular positions comprising an SCR and a momentary interrupter connected in series circuit with said motor between a pair of terminals adapted to be connected to a DC source, said SCR having a gate electrode to which an input signal is applied to cause said SCR to conduct current so that said motor rotates, and said motor being mechanically coupled to said momentary interrupter so that when said shaft reaches one of said predetermined angular positions the momentary interrupter momentarily opens and again closes said series circuit whereby the SCR stops conducting while the circuit is open and the motor stops until an input signal is again received at the gate electrode of the SCR.

2. Means as claimed in claim 1 wherein said momentary interrupter comprises a conductive cam mounted for rotation by said motor on said shaft, said shaft being of conductive material, a first sliding contact riding on said shaft, and a second sliding contact riding on said cam, said cam having a plurality of segments equal in number to said plurality of angular positions and each sugment ending in an abrupt drop-off so that as the motor turns the cam said second sliding contact falls from a drop-off on one segment to the beginning of the next segment and current to the SCR is interrupted during this fall of the second sliding contact.

3. Means as claimed in claim 2 wherein said motor is mechanically coupled to the shaft of said momentary interrupter via reduction gearing.

4. Means as claimed in claim 2 wherein a resistor is connected in parallel with said motor so that current through the SCR is not interrupted during commutation of said DC motor.

5. Means as claimed in claim 3 wherein said shaft actuates at least one switch cyclically between open and closed positions, said switch controlling current flow to a further motor.

6. Means as claimed in claim 1 wherein a resistor is connected in parallel with said motor so that current through the SCR is not interrupted during commutation of said DC motor and wherein said input signal is derived from an amplifier fed by a frequency selective microphone whenever said microphone receives acoustical signals in a frequency range to which it is sensitive.

7. Means as claimed in claim 3 wherein said shaft actuates at least one switch cyclically between first and second positions, said switch controlling current flow to a further motor, and wherein said input signal is derived from an amplifier fed by a frequency selective microphone whenever said microphone receives acoustical signals in a frequency range to which it is sensitive.

8. Means as claimed in claim 3 mounted in a toy tracked vehicle having a left track DC motor and a right track DC motor, each of said track motors being connected to a current source via an associated reversing switch, said shaft actuating each reversing switch cyclically between first and second positions to control current flow to the track motors so that each moves either forward or reverse cyclically such that the toy vehicle moves forward, reverse, left turn, right turn cyclically in response to successive occurrences of said input signal, said input signal being derived from an amplifier fed by a frequency selective microphone whenever said microphone receives acoustical signals in a frequency range to which it is sensitive.

9. Means as claimed in claim 3 mounted in a toy tracked vehicle wherein a resistor is connected in parallel with said motor so that current through the SCR is not interrupted during commutation of the motor, said vehicle having a left track DC motor and a right track DC motor, each of said track motors being connected to a current source via an associated reversing switch cyclically between first and second positions to control current flow to the track motors so that each moves either forward or reverse cyclically such that the toy vehicle moves forward, reverse, left turn, right turn cyclically in response to successive occurrences of said input signal, said input signal being derived from an amplifier fed by a frequency selective microphone whenever said microphone receives acoustical signals in a frequency range to which it is sensitive.

* * * * *